United States Patent [19]

Kridler et al.

[11] 4,192,283
[45] Mar. 11, 1980

[54] BARBECUE GRILL COVER POSITIONING MEANS

[75] Inventors: Edward L. Kridler, Lincolnshire; Marvin W. Eisenhauer, Antioch; Loyal A. Huson, Round Lake Park, all of Ill.

[73] Assignee: Beatrice Foods Co., Chicago, Ill.

[21] Appl. No.: 881,144

[22] Filed: Feb. 27, 1978

[51] Int. Cl.² .............................. F24b 3/00
[52] U.S. Cl. .................... 126/25 AA; 126/220; 292/338; 248/351; 217/60 B
[58] Field of Search ............ 126/25 A, 25 AA, 9 R, 126/9 B, 9 A; 220/335; 292/338; 16/113, 110 R, DIG. 25, 116, DIG. 24; 217/60 R, 60 B, 60 G; 248/351, 354 R, 354 P, 354 L; 229/23 R, 34 R, DIG. 18

[56] References Cited

U.S. PATENT DOCUMENTS

| 1,986,307 | 1/1965 | Wagner | 217/60 C |
|---|---|---|---|
| 2,504,344 | 4/1950 | Morrison | 16/116 R |
| 2,520,578 | 4/1950 | Treloar | 126/25 R |
| 3,557,771 | 1/1971 | Koziol | 126/25 A |
| 3,834,745 | 9/1974 | Coates | 126/9 B |
| 4,040,343 | 8/1977 | Delucchi | 126/9 R |

Primary Examiner—Samuel Scott
Assistant Examiner—Gerry Anderson
Attorney, Agent, or Firm—George J. Netter

[57] ABSTRACT

A heat-insulated rotatable handle extends through an opening in the cover side wall of a barbecue grill to interconnect with a generally L-shaped lever arm located inside the cover. By the handle alone, the cover may be raised or lowered, and, at the same time, rotation of the L-shaped lever arm permits selectively locating an end portion of the arm within any one of a plurality of slots in the grill fire bed wall to achieve a corresponding opening relation.

3 Claims, 4 Drawing Figures

BARBECUE GRILL COVER POSITIONING MEANS

BACKGROUND OF THE INVENTION

The present invention relates generally to a barbecue grill, and, more particularly, to such a grill having a cover and improved means for adjustably positioning the cover at selective spacings to the grill fire bed.

Domestic barbecue grills for either indoor or outdoor use are frequently provided with a cover that pivots from a completely open position, allowing access to the fire bed and cooking rack, to a closed position over the rack and fire bed, confining the heat and smoke. For certain kinds of cooking, it is desirable to close the cover partially over the fire bed, substantially confining the heat and smoke, but allowing some to escape. In the past, latch members and a support bar with notches have been used for adjustably locating the cover at various degrees of closure, but have not been found completely satisfactory.

SUMMARY OF THE INVENTION

In the practice of this invention there is provided a barbecue grill having an open-top fire bed and a shell-like cover pivotally interconnected with the fire bed. The fire bed has a continuous upstanding enclosing outer wall, the side portions of which have parts extending at two different heights and mating with correspondingly shaped edge walls of the cover. Two sets of notches or slots are formed in one of the fire bed side walls.

A heat-insulated rotatable handle extends through an opening in the cover side wall to interconnect with a generally L-shaped lever arm located inside the cover. By the handle alone, the cover may be raised or lowered, and, at the same time, rotation of the L-shaped lever arm permits selectively locating an end portion of the arm within any one of the slots to achieve a corresponding opening relation. The handle and L-shaped lever arm are of simplified construction readily amenable to quantity production techniques, and which permit safe lifting and height adjusting being accomplished with one hand.

DESCRIPTION OF A PREFERRED EMBODIMENT

Figure 1:
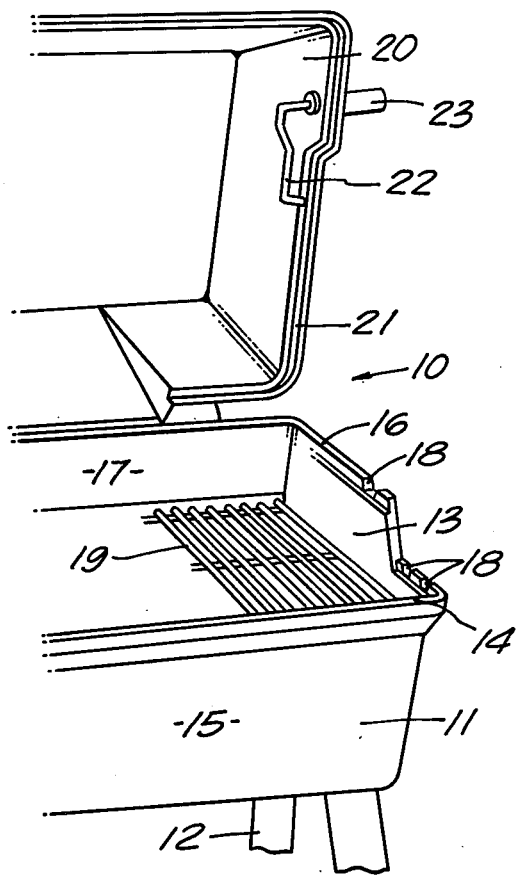
FIG. 1 is a perspective, partially fragmentary view of a barbecue grill showing the cover positioning means assembled.
Figure 2:
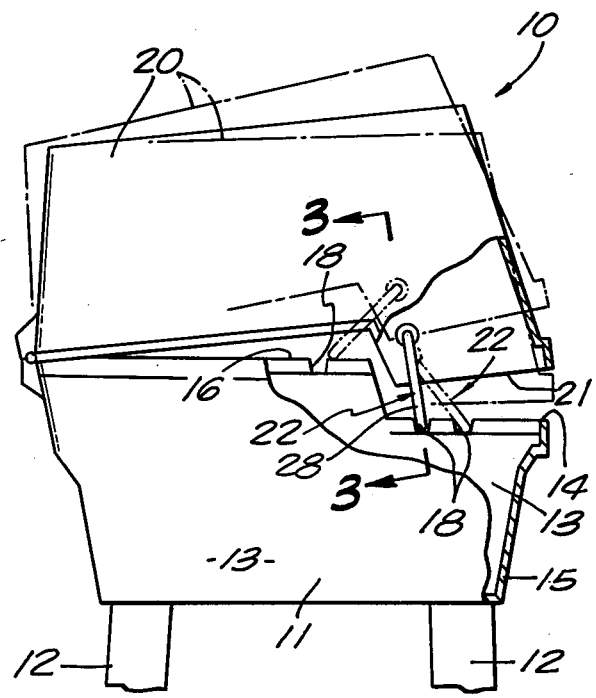
FIG. 2 is an end elevational view of the barbecue grill of FIG. 1 showing phantom-depictions of the grill cover at different height adjustments.

With reference simultaneously to FIGS. 1 and 2, the barbecue grill 10 is seen to include generally an open-top fire bed 11, mounted on legs or pedestals 12 for suitable resting support on a convenient ground or floor plane. The side wall 13 extends upwardly to a first level 14 that is coplanar with the front wall panel 15, and a second level 16 higher than 14, which is coextensive with the back or rear wall panel 17. A plurality of slots 18 are formed in the upper edge of one side wall of the fire bed, certain of them at level 14 and others at level 16. A cooking rack 19 is provided on which food materials can be placed.

A shell-like cover 20 is of such geometry and dimensions as to enable it to rest in edge contacting relation on the open top of the fire bed 11. The cover is hinged along the back wall of the fire bed such that the cover may be swung from an open to a closed position. The lower edge of the cover has a continuous shoulder 21 which fits onto the upper edge of the fire bed walls, providing both an even continuous supporting relationship for the cover, and also a substantial seal against the escape of smoke and heat when in covering relation.

A cover support means 22 and control handle 23 are mounted in the cover sidewall, which in a way that will be more particularly described, positions an end portion of the support means 22 in any one of the slots 18, thereby positioning the cover at corresponding different angular spaced arrangements to the fire bed (FIG. 2).

Figure 3:
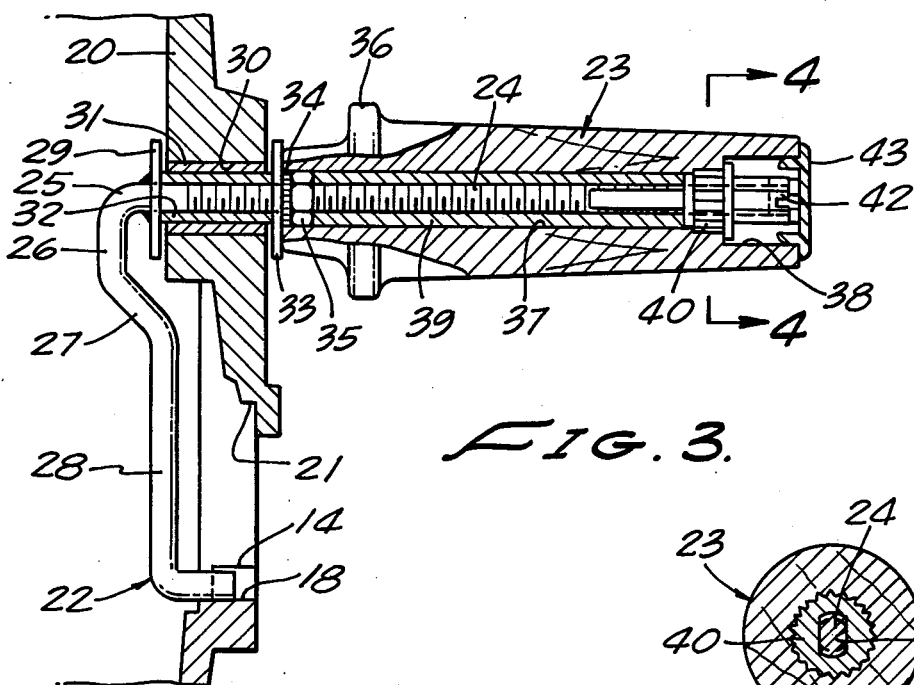
FIG. 3 is an enlarged sectional elevational view of the handle and cover support means taken along line 3—3 of FIG. 2.
Figure 4:
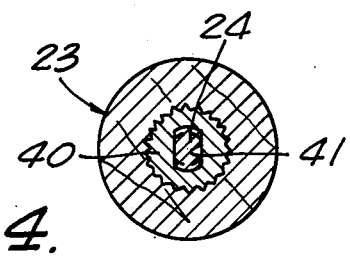
FIG. 4 is a sectional view through the handle taken along line 4—4 of FIG. 3.

For the ensuing detailed description of the handle and cover support means, reference is especially made to FIGS. 3 and 4. The cover support means 22 is a one-piece metal rod formed generally into an L-shape, with a straight line threaded portion 24 extending through the cover wall and handle and further portion 25 formed at right angles to 24 and lying substantially parallel to the cover side wall at the interior of the cover. The supporting means rod portion 25 has a first part 26 at right angles to 24, a part 27 formed angularly from 26 toward the inside of the cover side wall, a further part 28 parallel with 26, and a terminal part bent toward the cover wall and generally parallel to the threaded portion 24. Immediately adjacent the junction with 25, a washer 29 is welded or otherwise secured to the rod portion 24, which washer is sufficiently large to serve as a limit to drawing 24 through an opening 30 in the cover wall.

A splined hollow bushing 31 is forced into the opening 30 for securement therein and is of such length that its two ends are flush with the outer cover walls. A further bushing 32 of length slightly greater than the length of bushing 31 has a bore permitting receipt onto the rod portion 24 and an outer diameter such as to enable sliding receipt within 31. A washer stop 33, lock washer 34 and nut 35 secure the cover supporting means to the cover against removal via the opening 30. By virtue of the relative dimensions of the bushings 31 and 32, the cover support means 22 is rotatable within bushing 31 which serves as a journal.

The handle 23 is a generally cylindrical member having an enlarged circumferentially extending ridge or hand guard 36 located closely adjacent one end and a longitudinally extending bore 37 or dimensions enabling fitting receipt onto the nut 25 and lock washser 34. The handle bore opens out into an enlarged cavity 38 at the end opposite the hand guard. Although other materials may be found advantageous, the handle is preferably constructed of a material offering good insulation against heat (e.g., wood).

In assembly, a cylindrical tube 39 of a good heat insulating material has an outer diameter enabling sliding receipt within the handle bore 37 and internal dimensions permitting being received onto rod portion 24. A splined bushing 40, with a slotted opening 41 is forced into the end of the handle bore 37. The outer end portion of the rod 24 has two opposite sides formed into flat parallel surfaces for fitting receipt through bushing opening 41, thereby securing the rod 24 for rotation with the handle. A nut 42 is threaded onto the outer end of rod 24 unitarily securing the handle and cover supporting means together. A cap 43 may be inserted into enlarged opening 38 to give a finished appearance.

When it is desired either to open or close the cover, the handle may be gripped and the cover moved as desired. In order to make adjustments in the opening relation between cover and fire bed, at the same time that supportive force is applied to the handle, the handle is rotated to locate the terminus of the rod portion 28 in the desired slot 18 on level 14 (FIG. 2). When it is desired to close the cover completely on the fire bed, the end of the rod portion 28 is placed in the slot on level 16 (FIG. 2) and the cover may now be lowered in place.

What is claimed is:

1. In a barbecue grill having an open-top fire bed having enclosing side walls terminating in a continuous upper edge and shell-like cover with enclosing front, back and side walls terminating in a continuous edge having a plurality of slots therein, the cover being hingedly connected to the fire bed, enabling closing of the cover onto the fire bed, bringing the wall edges of each into substantially sealing relation, the improvements comprising:

a generally L-shaped metal rod, one arm of which has a thread thereon and extends through an opening in a side wall of the cover to extend outwardly of said cover and the arm of which is within the cover;

a bushing located within the cover side wall opening and receiving the threaded arm for rotation therein;

a tube of a heat insulator material received onto the threaded arm extending outwardly of the cover;

a generally cylindrical handle having a longitudinally extending bore, said bore being received onto the tube of a heat insulator material; and a bushing secured within the handle bore for unitary movement therewith, said bushing having a slotted opening which is received onto a similarly shaped end portion of the L-shaped metal rod one arm such that rotation of the handle about the bore axis rotates the rod other arm for selective location in any one of the fire bed edge slots.

2. A barbecue grill as in claim 1, in which first and second washers are received on the L-shaped rod, one on each side of the cover, and fixedly located with respect to said rod acting as stops to prevent removal of the rod through the cover opening.

3. A barbecue grill as in claim 1, in which the handle includes a raised circumferentially extending ridge lying between the cover and that part of the handle that is gripped.

* * * * *